July 14, 1936.  L. L. MAYER ET AL  2,047,643
FLOTATION SEPARATION APPARATUS
Filed Dec. 15, 1934  3 Sheets-Sheet 2
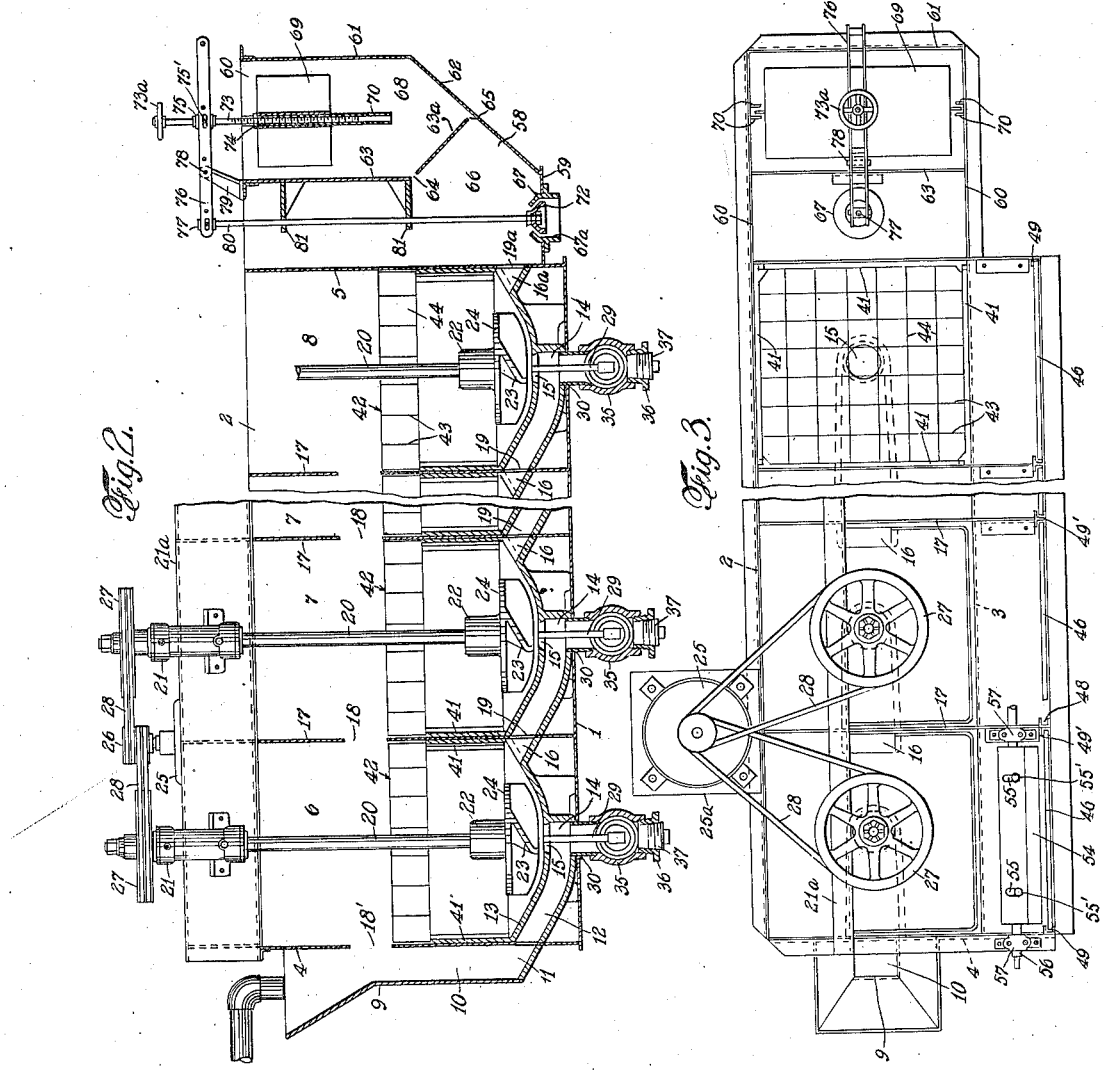
INVENTORS
Lawrence L. Mayer & Robert M. Hale
BY
Williams, Rich & Morse
ATTORNEYS July 14, 1936. L. L. MAYER ET AL 2,047,643
FLOTATION SEPARATION APPARATUS
Filed Dec. 15, 1934 3 Sheets-Sheet 3
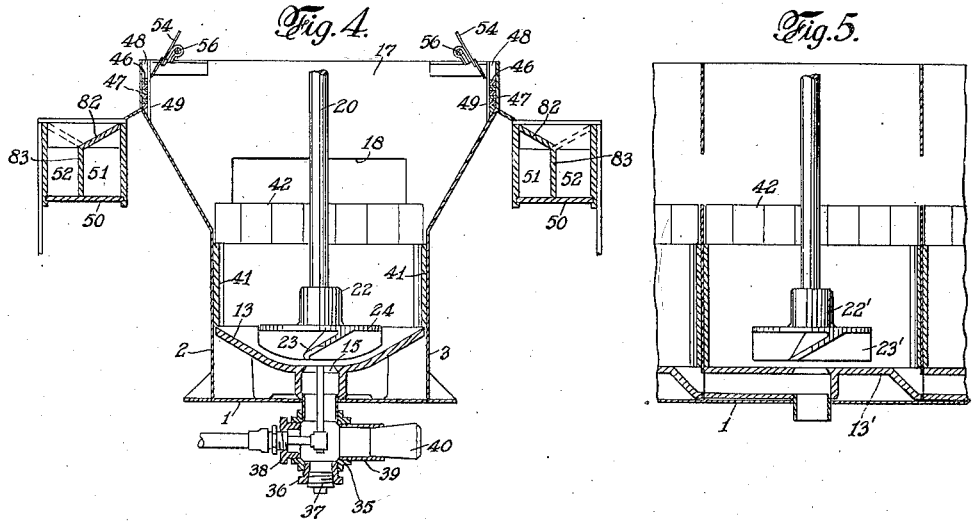
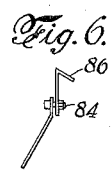
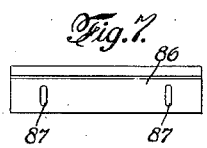
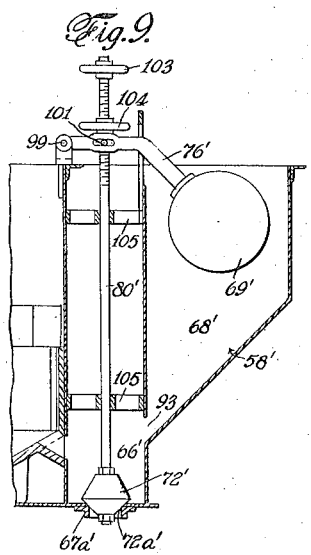
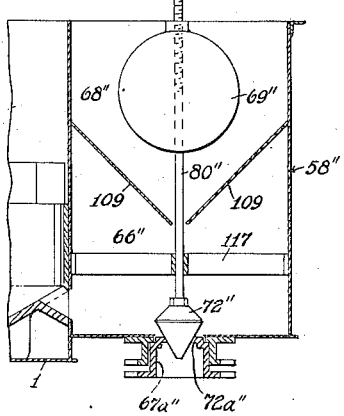
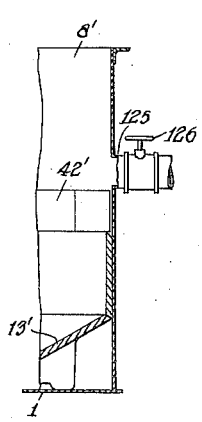
INVENTOR
Lawrence L. Mayer & Robert L. Hole
BY
Williams, Rich & Morse
ATTORNEYS Patented July 14, 1936

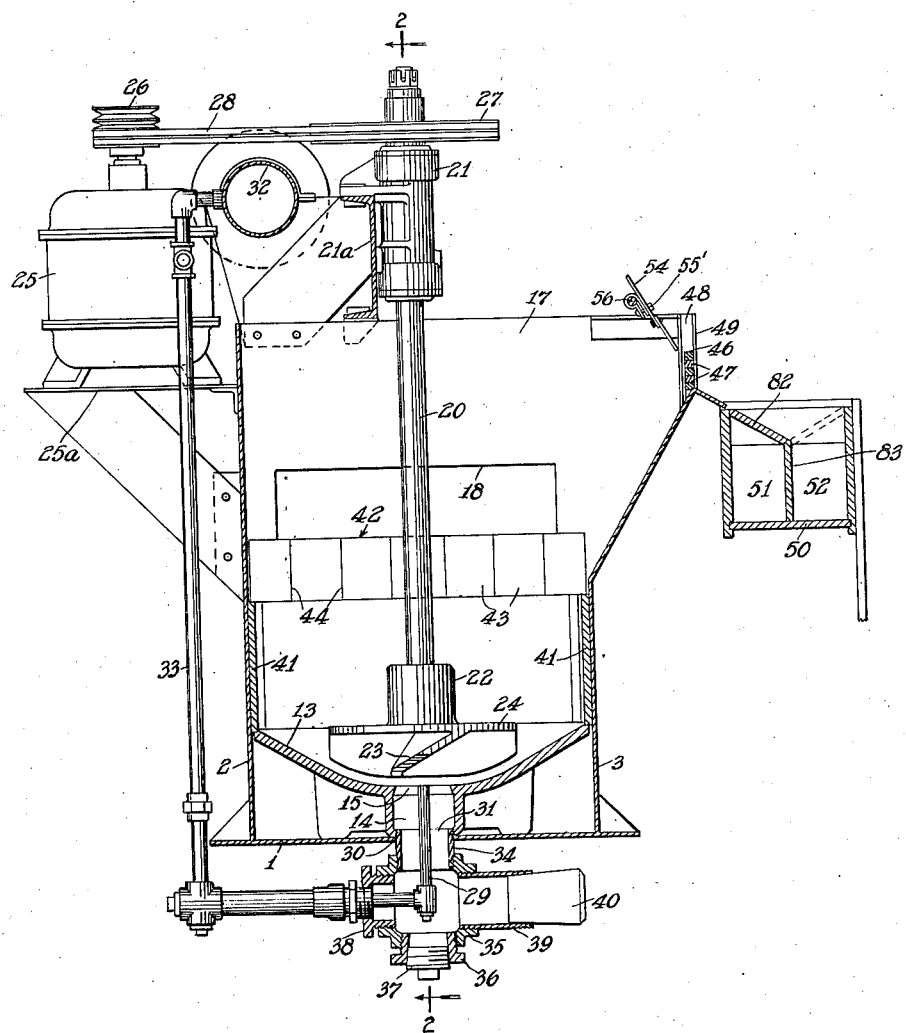

2,047,643

UNITED STATES PATENT OFFICE 2,047,643

FLOTATION SEPARATION APPARATUS

Lawrence L. Mayer, Palo Alto, Calif., and Robert M. Hale, Scarsdale, N. Y., assignors to Minerals Separation North American Corporation, New York, N. Y., a corporation of Maryland Application December 15, 1934, Serial No. 757,634

10 Claims. (Cl. 209—169)

This invention relates to improvements in flotation separation apparatus. It is adapted for use in separating certain constituents of various materials from each other by preferentially floating (either with or without air) one constituent, with respect to another constituent, and may be used in the treatment of minerals, ores, coal, slimes, trade wastes, water, sewage, wool grease, starch-glucose mixtures, chemicals, etc. For example, it may be used in the separation of sawdust from sand. However, it is herein shown and particularly described as embodied in an apparatus especially adapted to be used in a froth-flotation separation process such as is employed in the concentration of ores, wherein the materials are subjected to agitation and aeration in a liquid medium in the presence of a frothing agent and/or other reagents.

An object of the present invention is to provide an improved apparatus of the character mentioned which is compact, relatively inexpensive to build, economical in operation, and which is structurally such that the materials undergoing treatment may be caused to flow backward as well as forward through the apparatus, thus giving the metalliferous particles increased opportunities to come into contact with the air bubbles.

Another object of the invention is to provide an apparatus of the character mentioned which is such as to require but little attention on the part of an operator or attendant to maintain the operation at high mechanical and metallurgical efficiency even under varying mill conditions.

A further object of the invention is to provide an apparatus of the character mentioned which will permit relatively coarse or heavy materials to pass through the machine, thus insuring against their undue accumulation and thereby obviating the possibility of their clogging the apparatus.

To the above and other ends the invention contemplates a series of chambers or cell units, which are located on the same horizontal level and in which pulp agitation and flotation separation take place, each unit being provided with a rotary agitator or impeller serving to agitate the pulp, to break up the air into small bubbles, and to effect a positive flow of pulp forward through the apparatus and the cells being so interconnected as to permit a back flow or back circulation of the pulp, thereby insuring pronounced metallurgical efficiency of the apparatus.

Other objects and advantages of the invention will become apparent from the following description, taken in connection with the accompanying drawings, in which—

Fig. 1 is a transverse sectional view of an apparatus embodying the invention; Fig. 2 is a longitudinal sectional view, taken on the line 2—2 of Fig. 1, certain parts being broken away and other parts omitted; Fig. 3 is a plan view of the apparatus as it appears in Fig. 2; Fig. 4 is a transverse sectional view of a slightly modified form of cell; Fig. 5 is a view, partly in section and partly in elevation, of another slightly modified form of cell; Figs. 6 and 7 are, respectively, edge and side elevations of a modified form of adjustable froth-discharge lip; Fig. 8 is a bottom view of the agitator appearing in Figs. 1, 2 and 4; Figs. 9 and 10 are views, partly in section and partly in elevation, of modified forms of float-valves which may be employed in lieu of the form of float-valve shown in Figs. 2 and 3, and Fig. 11 is a view, partly in section and partly in elevation, of a modified form of tailings outlet which may be used with the apparatus.

Referring particularly to Figs. 1 to 4, the apparatus comprises a trough or box-like vessel having a horizontal bottom portion 1, two side-walls 2 and 3, and two end-walls 4 and 5, said vessel being divided into a series of connected or communicating pulp-agitating and froth-separating cells or units 6, 7 and 8. Any number of intermediate cells 7 may be interposed in series between the end cells 6 and 8, but for convenience of description only two such cells are herein illustrated, one being shown fragmentally and the other in its entirety.

At the feed end of the apparatus, as viewed at the left in Fig. 2, there is a feed-conduit which is open to the atmosphere at its top and includes a feed-box 9, disposed adjacent the outer side of the end wall 4 and leading to the top of a passage 10 which terminates at an opening 11 in the end wall and serves to guide the pulp into the intake conduit 12, which extends under the bottom member 13 of the first cell or unit 6. For convenience and economy, the side, end and bottom-forming portions of the feed-conduit are made integral with the bottom member 13.

The intake conduit 12 terminates at its inner end in a semi-circular wall 14 which is concentric with the axis of an impeller 22, hereinafter more particularly described. The passage 10 and the conduit 12 and the opening 11 constitute a feed passage, down which the pulp flows and through which it is drawn by the impeller 22 of the first cell or unit 6.

The cell or unit 6 includes the end wall 4, the bottom member 13 (having a centrally located feed inlet or inlet-opening 15 and a marginally disposed outlet-opening or lower pulp-passage 16) and a transverse wall 17 having an upper pulp-passage 18 and provided with an opening 19 registering with the pulp passage 16, the rear-end-wall pulp-passage 18 being disposed in line with a similar pulp-passage 18' formed in the front-end-wall 4.

Each of the intermediate cells or units 7 is substantially identical with the cell 6 and for that reason such intermediate cells need not herein be described individually in detail, except possibly to point out that they are separated from each other by, and are each common to, a pair of the above-mentioned transverse walls or partitions 17, that they communicate with each other through certain of the lower pulp-passages 16 and certain of the upper pulp-passages 18, and that the first of these cells communicates with the cell 6 by way of the pulp-passages 16 and 18 which are respectively peculiar to the cell 6 and its adjacent transverse wall 17. The passages 18 and the passage 18' may be of any suitable shape, may extend all the way to the top of the several cells and with them may be associated suitable means for adjusting their effective areas.

The end-cell 8 is substantially identical with each of the intermediate cells 7 and for that reason need not herein be described in detail, except to point out that it includes the rear-end-wall 5 and one of the transverse walls or partitions 17 as its front wall, and that it communicates with the adjacent intermediate cell by way of the pulp-passages 16 and 18 which are respectively peculiar to such intermediate cell and the last of the transverse walls 17. The rear-end-wall 5 of the end cell 8 serves as the front wall of a tailings discharge unit 58, hereinafter more particularly described, into which the tailings from the end-cell 8 are directed by way of an outlet opening or tailings discharge 16a and an opening 19a corresponding respectively to the outlet openings 16 and the openings 19 hereinbefore described.

Associated with each of the units 6, 7 and 8 is a vertical shaft 20 journaled in and supported by an overhead bearing 21, supported by a member 21a and carrying at its lower end the rotary impeller 22, which includes a disc 24 carrying a plurality of curved inclined blades 23 shaped at their lower edges to conform generally to the contour of the bottom members 13 of the several cells 6, 7 and 8, four such blades being illustrated in the present apparatus. The impellers 22 are located directly above and are disposed in a coaxial relation to the respective openings 15 in the bottom members 13 of the several units, the openings 15 being, as hereinbefore stated, concentric with the adjacent semi-circular walls 14. The shafts 20 may be driven by any suitable means, such as a motor 25 mounted on a bracket 25a and may be connected to the shafts by belts 28, passing around the motor pulleys 26 and the shaft pulleys 27.

As shown in Fig. 2, the bottom portion 1 of the box-like vessel is provided with a series of openings 30, which register with the openings 31 formed in the bottom wall of the conduits 12 and which also register with the openings 15 provided in the bottom members 13 of the several cells. The openings 30, 31 and 15 peculiar to each cell are adapted, as shown in Fig. 1, to accommodate an air pipe 29, through which air may be discharged into the respective cells at points directly beneath the impellers 22, the air pipes 29 being connected to a suitable source of compressed air or to the atmosphere by the pipes 33. When compressed air is used the pipes 33 extend down from a header 32.

A suitable pipe 34, in association with its fittings 35, 36, 37, 38 and 39, within the latter of which is carried a removable plug 40, is attached to the bottom portion 1 of the box-like vessel adjacent each of the openings 30 to permit each of the cells 6, 7 and 8 to be easily drained or to permit the introduction of material thereinto.

In order to prevent the walls of the several cells in the zone of greatest agitation from wearing away by reason of the abrasive action of the pulp, suitable liners or lining members 41 may be employed. These liners may be of any suitable wear-resisting material, such as cast iron or rubber, and extend a substantial distance upward from the bottom member 13 of each cell.

If the respective cells are deep as compared with their other dimensions, the sides of such cells may be utilized in themselves to baffle or quiet the pulp, but for mechanical and other reasons it is desirable to employ for each cell a baffle 42, which may be of cast iron, plate steel, or any other suitable material. Each of the baffles 42 is shown as a grid or lattice-work consisting of a plurality of vertical members 43 and 44 (Figs. 1, 2 and 3) which are so arranged as to permit free or unimpeded upward flow of the pulp and at the same time to restrain the swirl of the pulp so as to confine impeller agitation to the lower zone of the respective cells, they being in no sense intended to constitute partitions dividing the respective cells into separate compartments. These baffles are shown as resting on the liners 41.

As shown most clearly in Figs. 1 and 3, one of the side walls of the respective units 6, 7 and 8 is provided with an adjustable lip 46 over which the froth or float concentrate is adapted to flow, the height of the overflow-lip being governed by the required number of superimposed slats 47 on which the lips are supported and which are removably disposed within guideways 48 formed by channel members 49 and 49', the former of which are secured to the end walls 4 and 5 of the box-like vessel and the latter of which are secured to the transverse walls 17 of that vessel. It will be understood that inasmuch as the overflow-lips 46 may be positioned in various horizontal planes, the desired depth of froth or float concentrate in each cell unit may be attained, which froth or float concentrate, when passing from the cells by way of the lips 46, is directed into a double launder 50, having troughs 51 and 52.

In order to facilitate removal of the froth or float concentrate from the several cells, there is provided for each cell a wiper or paddle 54, which is supported on a revolving shaft 56, journalled in bearings 57 and adapted to be rotated by any convenient mechanical means, not shown. Inasmuch as it may be desired to vary the sweep of the respective paddles, each of them is provided with elongated openings 55 and bolts 55' or the like, by which they may be secured in various positions of adjustment, as will be readily understood.

Associated with the end cell 8 is a tailings-discharge unit 58, which includes the end wall 5 of that cell, a bottom wall 59, side walls 60, an end wall 61 and an inclined bottom portion 62. Transverse walls 63 and 63a divide the tailings-discharge unit 58 into compartments 66 and 68, between which free passage of pulp is permitted by way of openings 64 and 65 provided in the wall 63a. In the bottom wall 59 of the tailings-discharge unit, there is provided an opening 67, within which is disposed a valve seat 67a, through which the tailings from the cell 8 are discharged; and within the compartment 68 there is disposed a float 69, which is held against transverse displacement by suitable guides 70 and which is supported by the pulp or liquid which flows from the compartment 66 into the compartment 68. The float 69 is adapted to actuate a valve 72, disposed in a cooperative relation to the valve seat 67a, and to this end the float is connected to a valve actuating arm or lever 76, which is pivotally connected, as at 78, to a suitably supported bracket 79, and is pivotally connected, as at 77, to a valve rod 80, which is guided in suitably supported guide arms 81 and carries at its lower end the valve 72. Preferably the connection afforded between the float 69 and the valve actuating lever 76 is adjustable, and to this end the connecting means between these two elements includes a screw element 73, which passes through a threaded unit 74, fastened to the float, the upper end or unthreaded portion of the screw element being provided with a handwheel 73a and journaled in a bearing 75 which is pivotally connected, as at 75', to the lever 76.

From the foregoing, it will be understood that as the pulp level in the cell 8 rises above or falls below the normal operating pulp level due to an increase or decrease in the amount of pulp entering the apparatus, the pulp levels in compartments 66 and 68 correspondingly rise or fall. As the pulp level in compartment 68 rises or falls, the float 69 assumes a corresponding position, thereby lowering or raising the valve 72 and thus increasing or decreasing the effective area of the outlet opening 72a, of the valve seat 67a, until the pulp in the apparatus has again assumed its normal level.

The float concentrate, flowing over the lips 46, may all be collected in either the trough 51 or the trough 52 of the launder 50, or, it may be advisable in some cases to separate the concentrate overflow of one cell or group of cells from that of another cell or group of cells. To effect such a separation, hinged aprons 82 are provided, which aprons may be attached to the common wall 83 of the launder 50 and may be swung outwardly from the position shown in full lines in Fig. 1 to the position indicated by dotted lines therein, thus permitting part of the concentrates to be drawn off through the trough 52 while another portion of the concentrates is flowed into the trough 51 to be returned to the circuit, if desired.

Referring to Fig. 4, it will be noted that the form of invention shown therein is substantially identical with that shown and described in connection with Figs. 1 to 3 inclusive, except that the upper part is in double spitzkasten form and the launder 50, the set of paddles 54 and the set of adjustable discharge lips 46, all hereinbefore described, are duplicated, there being one such launder, one such set of paddles and one such set of adjustable discharge lips disposed at each side of the apparatus to facilitate discharge and collection of the froth concentrate at each side of the respective cells.

In Fig. 5 the modification resides primarily in the slightly different form or shape of the bottom 13' that may be employed in connection with the respective cell units 6, 7 and 8, and in the slightly different form of impeller 22' that may be employed with the modified form of cell bottom, it being noted that the cell bottom presents generally a flat upper surface, in contrast to the dished or cup-shaped contour of the cell bottom 13 appearing in Figs. 1 to 4 inclusive and hereinbefore described, and that the impeller in the present instance differs from the impeller hereinbefore described only in that its blades 23' present straight-edge, rather than curved, surfaces at their lower extremities.

If desired, the form of adjustable froth overflow or discharge lip 86, shown in Figs. 6 and 7, may be employed in lieu of the adjustable discharge lips 46 hereinbefore described. The discharge lip 86 may be of metal, and is provided with a pair of elongated openings 87, adapted for the reception of bolts 84, by which it may be attached to the side wall 3 of each of the cell units, reference being had to Figs. 1 to 3, or to each of the side walls 2 and 3 of the respective cell units, as will be appreciated when taking into account the disclosure of Fig. 4 in association with the description of the form of invention appearing therein.

Referring to Fig. 9, the form of tailings-discharge unit 58' shown therein is substantially the same as the tailings-discharge unit 58, hereinbefore described, except that the chambers 66' and 68' communicate with each other through a single opening 93 rather than through a pair of openings such as are indicated at 64 and 65 in Fig. 2. As to the float valve construction, however, the changes are somewhat more pronounced, in that the float 69' is connected to a valve arm 76', which is pivotally supported at 99, and in that the valve stem 80' has a screw-thread connection with a yoke 101, which is pivotally connected to the valve arm intermediate the ends thereof. It will be observed in the present instance that the operation of the float valve structure is substantially reverse to that of the float valve structure, hereinbefore described, inasmuch as the valve 72', which is connected to the valve stem 80', is lifted from its seat 67a', to permit a discharge of tailings through the opening 72a', as the float 69' moves upwardly in accordance with the rise of the liquid level within the tailings-discharge unit 58', and is closed as the float recedes according to the drop of the pulp level in the compartment 68'. In order that an adjustment may be readily effected between the valve arm 76' and the valve stem 80', such valve stem is provided at its upper end with a handwheel 103, by which the effective length of the valve stem may be changed, the valve stem being adapted to be locked in a given position of adjustment by a handwheel 104, which is carried by the screw-threaded portion of the valve stem and is adapted to be run down into locking engagement with the yoke 101. Preferably the valve rod 80' is held against undue transverse displacement by a pair of suitably supported guides 105 through which the valve stem passes.

The form of tailings-discharge unit 58'' shown in Fig. 10, differs from the previously described tailings-discharge units in that it is divided, by a pair of inclined divisional walls 109, into compartments 66'' and 68'', the latter of which is located directly above the former and is adapted to communicate therewith through the space afforded between the lower ends of the inclined divisional walls. The valve 72" is substantially identical with the valve 72', hereinbefore described, and is connected to a valve stem 80" which in turn is connected to a float 69", the valve being located within the lower compartment 66" and the float being located within the upper compartment 68". Preferably the valve rod 80" is held against lateral displacement by a suitably supported guide 117, disposed within the lower compartment 66". In order that the effective length of the valve rod 80" may be varied to meet varying conditions, the upper end of the valve rod has a screw-thread connection with the float 69" and is provided with a handwheel 114, by which the rod may be moved to various positions of vertical adjustment with relation to the float. The operation of the present form of float valve structure is similar to that of Fig. 9 in that the valve 72" is lifted from its seat 67a", to permit discharge of tailings from the compartment 66" by way of the discharge opening 72a", as the liquid level rises within the compartment 68", and in that the valve moves to its closed position as the liquid level within the compartment 68" recedes.

If it is desired to regulate the pulp level within the several cells 6, 7 and 8 by a hand-controlled, rather than by means of an automatically-controlled, float valve, such as is described in connection with the several forms of tailings-discharge units shown in Figs. 2, 3, 9 and 10, the last cell, indicated in Fig. 11 by the numeral 8', may be provided with a tailings-discharge outlet-conduit 125, which communicates with that cell at a point above its baffle 42' and which is provided with a hand-operated valve 126. It is obvious that by opening or closing the valve 126, as operating conditions dictate, a desired pulp level may be maintained in the several cells of the apparatus, and it is also obvious that when such control-valve is employed the necessity for a tailings-discharge opening, such as the outlet-opening 16a hereinbefore described, is obviated, as well, of course, as the necessity for a tailings-discharge unit 58, 58', 58".

Preparatory to carrying on a flotation process with the aid of the apparatus embodying the present invention, the material to be treated may be prepared in a suitable preliminary mixture by commingling it with water, suitable flotation agents, modifying agents or chemicals and air to produce a pulp. The pulp may then be fed into the passage 10, as by a pipe 45, from which passage it flows into the cell 6 by way of the intake conduit 12, the pulp being rapidly drawn up into the cell 6 by the pumping action of the impeller 22 located in that cell. The impeller so acts on the pulp as to thoroughly agitate it and at the same time commingle with it air which is delivered to the cell by way of the pipe 29, thus forming small bubbles in the material and causing it to rise in the cell with a rapid swirling motion. The swirling motion of the pulp is quieted by the baffle 42 and the concentrate-carrying bubbles move upwardly to and through the surface of the pulp where the froth or float-concentrate passes out of the cell and into its associated launder or launders 50 by way of the froth-discharge lip or lips 46. Tailings from the cell 6 flow and are drawn into the cell 7 under the pumping action of the impeller 22 of the cell 7 by way of the outlet opening 16 of the cell 6 and the intake conduit 12 of the cell 7, within which latter cell agitation and aeration is effected by its impeller 22, froth or float concentrate being delivered to the launder or launders as described in connection with cell 6. As the pulp progresses from left to right through the apparatus as viewed in Fig. 2, it is acted on in a like manner within the several cells through which it passes, the tailings from the cell 8 being finally directed into the tailings-discharge unit 58 by way of the outlet opening 16a corresponding to the outlet opening 16 of the cells 6 and 7. The tailings entering the tailings-discharge unit 58 are released from that unit under the control of a float-actuated valve 72, the operation of which is effected by the valve-actuating float 69 and its associated elements according to the height to which the liquid rises or the extent to which it falls within the compartment 68.

In the preferred operation of the apparatus embodying the present invention, with the construction shown as to impellers and passages and the speed at which the impellers are operated, the pulp is discharged out of the first cell at the bottom at a greater rate than that at which it is pumped into that cell at the bottom, whereas the pulp is pumped into the last cell at a greater rate than tailings are discharged out of that cell, and the delivery-rate of pulp to each of the intermediate cells at the bottom thereof is equal to the rate at which the pulp is discharged at the bottom thereof. However, the cells have upper connections through the pulp-passages 18, and the first cell is connected to the feed-conduit, of which the passage 10 forms a part, by the opening 18'. As a result of this construction and operation, when the pulp is introduced into the apparatus, with the cells empty, the end cell 8 first attains a higher level than the other cells, and then pulp flows backward through the connecting upper pulp-passages 18 and as a result of this back flow the same level is attained in the other cells successively from the rear to the front of the apparatus. This counter-current or back flow, not only from cell to cell, but back into the feed-conduit, is maintained throughout the operation of the apparatus, and causes a circulation and reagitation and reaeration of the pulp, thus giving the particles to be recovered increased opportunities to come into contact with the air bubbles and to be buoyed up into the froth or float and over-flowed or removed, hence promoting the efficiency of the apparatus.

If it is not desired to utilize the back-flow or counter-current feature above particularly described, the impeller-speeds may be reduced or impellers of a different construction employed, or the cross-sectional areas or arrangement of the intake conduits 12 may be altered, or both, so that there is no back flow of pulp through the upper pulp-passages 18. Thus the apparatus is adapted to varied applications in the processes in which it is employed.

Aside from the various modifications herein shown and described, other changes may be made without departing from the spirit of the invention or the scope of the following claims.

What is claimed is:

1. A flotation concentration apparatus comprising, in combination, a feed-conduit, a series of combined agitating and separating units, including first, last and intermediate chambers: adjacent chambers being separated by a wall and connected by an upper pulp-passage below the pulp level of such chambers: the last chamber having a tailings discharge: each chamber having a feed inlet for pulp and air or gas in the lower part of the chamber and an overflow lip for concentrates discharge: the first and intermediate chambers each having at the lower part thereof a lower pulp passage communicating with the feed inlet to the next chamber in the series: an impeller in the lower part of each chamber above the feed inlet, arranged to exert suction on the pulp at the feed inlet to draw it upward, to agitate the pulp and to force the pulp upwardly in the chamber: and said tailings discharge, feed inlets, lower pulp passages and impellers being so constructed and arranged that with given impeller speeds a back flow of pulp is set up in the apparatus as a whole through the upper pulp-passages in addition to the forward flow through the feed inlets and lower pulp passages.

2. A flotation concentration apparatus comprising, in combination, a feed-conduit, a series of combined agitating and separating units, including first, last and intermediate chambers: the last chamber having a tailings discharge: each chamber having a feed inlet for pulp and air or gas in the lower part of the chamber and an overflow lip for concentrates discharge: adjacent chambers being separated by a wall, and connected by an upper opening below the pulp level of such chambers: the first chamber being connected to the feed-conduit by an upper pulp-passage below the pulp level of such chamber: the first and intermediate chambers each having at the lower part thereof a lower pulp passage communicating with the feed inlet to the next chamber in the series: an impeller in the lower part of each chamber above the feed inlet, arranged to exert suction on the pulp at the feed inlet to draw it upward, to agitate the pulp and to force the pulp upwardly in the chamber: and said tailings discharge, feed inlets, lower pulp passages and impellers being so constructed and arranged that with given impeller speeds a back flow of pulp is set up in the apparatus as a whole through the upper pulp-passages in addition to the forward flow through the feed inlets and lower pulp passages.

3. A flotation concentration apparatus comprising, in combination, a feed-conduit, a pair of combined agitating and separating units including first and second chambers separated from each other by a wall and connected by an upper pulp-passage below the pulp level of such chambers: each chamber having a feed inlet for pulp and air or gas in the lower part of the chamber, and an outlet-opening, and an overflow lip for concentrates discharge: the outlet-opening of the first chamber communicating with the feed inlet to the second chamber: an impeller in the lower part of each chamber above the feed inlet, arranged to exert suction on the pulp at the feed inlet to draw it upwardly, to agitate the pulp and to force the pulp upwardly in the chamber: and said outlet openings, feed inlets and impellers being so constructed and arranged that with given impeller speeds a back flow of pulp is set up in the apparatus as a whole through the upper pulp-passage in addition to the forward flow through the feed inlet of the first chamber, the outlet-opening of the first chamber and the feed inlet of the second chamber.

4. A flotation concentration apparatus comprising, in combination, a feed-conduit, a pair of combined agitating and separating units including first and second chambers separated from each other by a wall and connected by an upper pulp-passage below the pulp level of such chambers: the first chamber being connected to the feed conduit by an upper pulp-passage below the pulp level of such chamber: each chamber having a feed inlet for pulp and air or gas in the lower part of the chamber, and an outlet-opening, and an overflow lip for concentrates discharge: the outlet-opening of the first chamber communicating with the feed inlet to the second chamber: an impeller in the lower part of each chamber above the feed inlet, arranged to exert suction on the pulp at the feed inlet to draw it upwardly, to agitate the pulp and to force the pulp upwardly in the chamber: and said outlet openings, feed inlets and impellers being so constructed and arranged that with given impeller speeds a back flow of pulp is set up in the apparatus as a whole through the upper pulp-passages in addition to the forward flow through the feed inlet of the first chamber, the outlet-opening of the first chamber and the feed inlet of the second chamber.

5. In a flotation concentration apparatus, a series of combined agitating and separating units, including first, last and intermediate chambers communicating with each other by way of upper pulp-passages below the pulp-level of said chambers and also communicating with each other by way of lower pulp-passages below said upper pulp-passages, the first chamber being provided with an introductory feed inlet, the last chamber being provided with a tailings discharge, each chamber having an overflow lip for concentrates discharge, and said lower pulp-passages constituting feed inlets for all of said chambers exclusive of the first; means for supplying air or gas to the lower part of each chamber; feed means for directing pulp into said series of chambers by way of said introductory feed inlet; and an impeller arranged in the lower part of each chamber to agitate the pulp therein, each impeller being so positioned with relation to the feed inlet of its corresponding cell and the path of communication afforded between that cell and the adjacent cell by way of one of said pulp passages between such adjacent cells as to facilitate entrance of pulp into said corresponding cell by way of its inlet and to facilitate discharge of pulp from that cell by way of said one of said pulp passages; said impellers, said upper pulp-passages, and said lower pulp-passages being so constructed and arranged that with given impeller speeds a back-flow of pulp is set up in the apparatus as a whole through one set of pulp-passages in addition to the forward flow of pulp through the other set of pulp-passages.

6. In a flotation concentration apparatus, a series of combined agitating and separating units, including first, last and intermediate chambers, adjacent chambers being separated from each other by a wall and communicating with each other by way of an upper pulp-passage formed in said wall below the pulp-level of said chambers and also communicating with each other by way of a lower pulp-passage below said upper pulp-passage, the first chamber being provided with an introductory feed inlet, the last chamber being provided with a tailings discharge, each chamber having an overflow lip for concentrates discharge, and said lower pulp-passages constituting feed inlets for all of said chambers exclusive of the first; means for supplying air or gas to the lower part of each chamber; feed means for directing pulp into said series of chambers by way of said introductory feed inlet; and an impeller arranged in the lower part of each chamber to agitate the pulp therein, each impeller being so positioned with relation to the feed inlet of its corresponding cell and the path of communication afforded between that cell and the adjacent cell by way of one of said pulp passages between such adjacent cells as to facilitate entrance of pulp into said corresponding cell by way of its inlet and to facilitate discharge of pulp from that cell by way of said one of said pulp passages; said impellers, said upper pulp-passages, and said lower pulp-passages being so constructed and arranged that with given impeller speeds a back-flow of pulp is set up in the apparatus as a whole through one set of pulp-passages in addition to the forward flow of pulp through the other set of pulp-passages.

7. In a flotation concentration apparatus, a pair of combined agitating and separating units, including first and second chambers communicating with each other by way of an upper pulp-passage below the pulp-level of said chambers and also communicating with each other by way of a lower pulp-passage below said upper pulp-passage, the first chamber being provided with an introductory feed inlet, the second chamber being provided with an outlet opening, each chamber having an overflow lip for concentrates discharge, and said lower pulp-passage constituting a feed inlet for the second chamber; means for supplying air or gas to the lower part of each chamber; feed means for directing pulp into said chambers by way of said introductory feed inlet; and an impeller arranged in the lower part of each chamber to agitate the pulp therein, each impeller being so positioned with relation to the feed inlet of its corresponding cell and the path of communication afforded between that cell and the adjacent cell by way of one of said pulp passages between such adjacent cells as to facilitate entrance of pulp into said corresponding cell by way of its inlet and to facilitate discharge of pulp from that cell by way of said one of said pulp passages; said impellers, said upper pulp-passage and said lower pulp-passage being so constructed and arranged that with given impeller speeds a back-flow of pulp is set up in the apparatus as a whole through one of said pulp-passages in addition to the forward flow of pulp through the other of said pulp-passages.

8. In a flotation concentration apparatus, a pair of combined agitating and separating units, including first and second chambers separated from each other by a wall and communicating with each other by way of an upper pulp-passage formed in said wall below the pulp-levels of said chambers and also communicating with each other by way of a lower pulp-passage below said upper pulp-passage, the first chamber being provided with an introductory feed inlet, the second chamber being provided with an outlet opening, each chamber having a overflow lip for concentrates discharge, and said lower pulp-passage constituting a feed inlet for the second chamber; means for supplying air or gas to the lower part of each chamber; feed means for directing pulp into said chambers by way of said introductory feed inlet; and an impeller arranged in the lower part of each chamber to agitate the pulp therein, each impeller being so positioned with relation to the feed inlet of its corresponding cell and the path of communication afforded between that cell and the adjacent cell by way of one of said pulp passages between such adjacent cells as to facilitate entrance of pulp into said corresponding cell by way of its inlet and to facilitate discharge of pulp from that cell by way of said one of said pulp passages; said impellers, said upper pulp-passage and said lower pulp-passage being so constructed and arranged that with given impeller speeds a back-flow of pulp is set up in the apparatus as a whole through one of said pulp-passages in addition to the forward flow of pulp through the other of said pulp-passages.

9. In a flotation concentration apparatus, a feed-conduit, a combined agitating and separating chamber separated from said conduit by a wall and connected to said conduit by an upper pulp-passage below the pulp-level of such chamber; said chamber having an outlet-opening, a feed inlet opening for pulp and air or gas disposed at the bottom of the chamber and communicating with the feed-conduit, and an overflow lip for concentrates discharge; an impeller in the lower part of said chamber above the feed inlet, arranged to exert suction on the pulp at the feed inlet to draw it upwardly in the chamber; said outlet-opening, feed inlet and impeller being so constructed and arranged that with a given impeller speed a back-flow of pulp is set up in the apparatus as a whole through the upper pulp-passage in addition to the forward flow through the feed inlet and the outlet-opening.

10. In a flotation concentration apparatus, a feed-conduit, a combined agitating and separating chamber having an outlet-opening and communicating with said feed-conduit by way of a back-flow pulp-passage and also communicating with said feed-conduit by way of a feed-inlet passage through which material to be treated is directed into said chamber from said conduit, said passages being disposed below the pulp-level of said chamber and one of said passages being disposed below the other; an overflow lip for concentrates discharge; and an impeller arranged in the lower part of said chamber to agitate the pulp therein, said impeller being so positioned with relation to said feed-inlet passage and said outlet-opening as to facilitate entrance of pulp into the cell by way of its feed-inlet passage and to facilitate discharge of pulp from the cell by way of its outlet-opening; said impeller, said outlet opening and said passages being so constructed and arranged that with a given impeller speed a back-flow of pulp is set up in the apparatus as a whole through said back flow pulp-passage in addition to the forward flow of pulp through said feed-inlet passage and said outlet-opening.

LAWRENCE L. MAYER.
ROBERT M. HALE.